United States Patent
Johnston

(10) Patent No.: US 7,751,440 B2
(45) Date of Patent: Jul. 6, 2010

(54) RECONFIGURABLE FRAME PARSER

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1432 days.

(21) Appl. No.: 10/728,552

(22) Filed: Dec. 4, 2003

(65) Prior Publication Data
US 2005/0122918 A1     Jun. 9, 2005

(51) Int. Cl.
H04J 3/16      (2006.01)
H04J 3/24      (2006.01)
G06F 15/16     (2006.01)
G06F 9/45      (2006.01)

(52) U.S. Cl. ............... 370/469; 370/474; 709/230; 717/143

(58) Field of Classification Search ............ 370/252, 370/310, 389, 392, 401, 465, 466, 469, 474; 709/230, 236; 717/136, 143
See application file for complete search history.

(56) References Cited

U.S. PATENT DOCUMENTS

| 6,363,380 | B1 | 3/2002 | Dimitrova | |
|---|---|---|---|---|
| 6,611,524 | B2 * | 8/2003 | Devanagondi et al. | ... 370/395.5 |
| 6,904,057 | B2 * | 6/2005 | Sarkinen et al. | ............. 370/469 |
| 7,106,730 | B1 * | 9/2006 | Bass et al. | .................. 370/389 |
| 7,130,987 | B2 * | 10/2006 | Sikdar | ........................ 712/200 |
| 7,184,722 | B1 * | 2/2007 | Johnson et al. | .......... 455/127.1 |
| 2003/0108038 | A1 * | 6/2003 | Devanagondi et al. | ...... 370/389 |
| 2003/0185220 | A1 | 10/2003 | Valenci | |
| 2003/0210702 | A1 | 11/2003 | Kendall | |
| 2004/0125807 | A1 * | 7/2004 | Liu et al. | ............... 370/395.32 |

FOREIGN PATENT DOCUMENTS

EP     0 852 448 A1     7/1998

* cited by examiner

Primary Examiner—Nittaya Juntima
(74) Attorney, Agent, or Firm—Kacvinsky LLC

(57) ABSTRACT

A method and apparatus to perform frame parsing are described wherein a configuration module stores configuration information and a parsing module, connected to the configuration module, receives a frame of information and determines a frame format associated with the frame. Configuration information corresponding to the protocol is retrieved, and a set of hardware elements are reconfigured to parse the frame. Other embodiments are described and claimed.

10 Claims, 6 Drawing Sheets

RECONFIGURABLE FRAME PARSER

BACKGROUND

A communication system may communicate information in the form of frames as defined by a given protocol. The frames may have a frame format that defines the fields within the frame and the position of the information within each field. Variations in communication protocols may lead to variations in frame formats. In addition, a single protocol may have several types of frame formats.

The communication system may use a frame parser to recover such frame information. A frame parser may have difficulty in parsing frame information, however, from the same or different protocols with varying frame formats. Consequently, there may be need for improvements in frame parsing techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
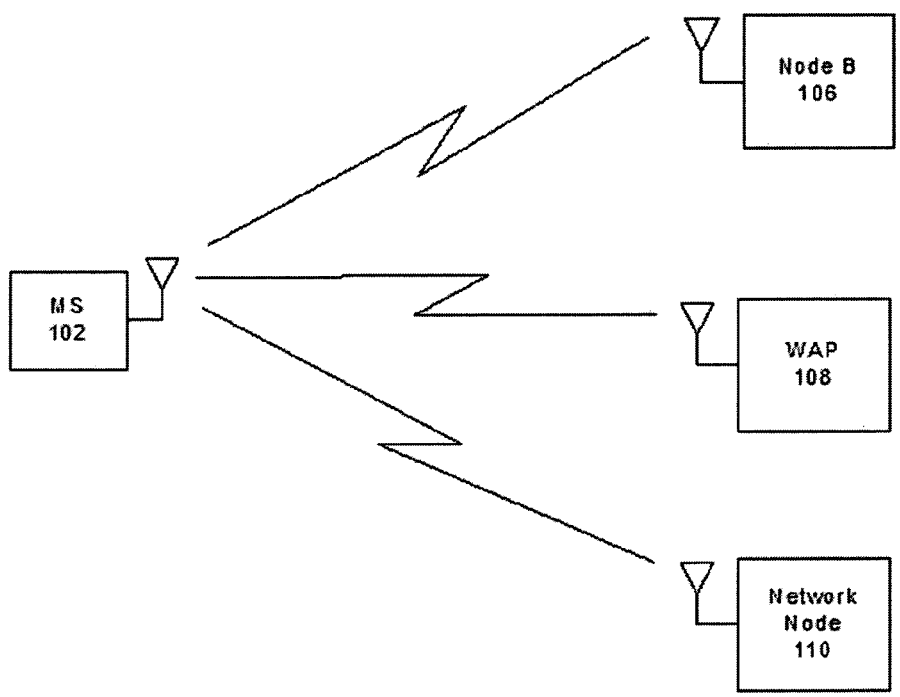
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. It can be appreciated that system 100 is provided by way of example only, and may comprise more or less elements in various topologies and still fall within the scope of the embodiments.

In one embodiment, system 100 may comprise a plurality of network nodes. The term "network node" as used herein may refer to any node capable of communicating information in accordance with one or more protocols. Examples of network nodes may include a computer, server, switch, router, bridge, gateway, personal digital assistant, mobile device, call terminal and so forth. The term "protocol" as used herein may refer to a set of rules or instructions to control how the information is communicated over the communications medium.

In one embodiment, system 100 may communicate various types of information between the various network nodes. For example, one type of information may comprise "media information." Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Another type of information may comprise "control information." Control information may refer to any data representing commands, instructions or control words meant for an automated system. For example, control information may be used to route media information through a network, or instruct a network node to process the media information in a predetermined manner.

In one embodiment, one or more communications mediums may connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

One embodiment may be implemented as part of a wired or wireless communication system. One embodiment will be described in the context of a wireless communication system for purposes of illustration. It may be appreciated, however, that the embodiments may be implemented in a wired communication system as well. The embodiments are not limited in this context.

As shown in FIG. 1, system 100 may comprise a wireless communication system. A wireless communication system may have one or more network nodes connected by communications mediums comprising RF spectrum for a wireless network, such as a cellular or mobile system. In one embodiment, for example, system 100 may comprise a mobile station (MS) 102 and a plurality of base stations 106, 108 and 110. Although FIG. 1 shows a limited number of network nodes, it can be appreciated that any number of network nodes may be used in system 100.

In one embodiment, network 100 may include MS 102. MS 102 may be any mobile device cable of communicating information over a wireless communication medium, such as a cellular telephone, personal digital assistant (PDA), mobile computer, and so forth. MS 102 may comprise a wireless transceiver connected to an omni-directional antenna. MS 102 may also comprise the appropriate interfaces to communicate media information, such as voice or data information. The voice information may comprise, for example, analog or digital voice information communicated using a circuit-switched network or packet network, respectively. An example of a circuit-switched network may comprise the Public Switched Telephone Network (PSTN). An example of a packet network may comprise a Local Area Network (LAN), Wide Area Network (WAN), the Internet, Voice Over Packet (VOP) network, and so forth. The data information may comprise any non-voice information communicated in a packet or frame format.

In one embodiment, MS 102 may be configured to communicate with a plurality of different base stations. Each base station may comprise a wireless transceiver connected to an omni-directional antenna. Further each base station may have the appropriate interfaces to communicate information to MS 102 over a wireless communication medium. Each base station may communicate the information in accordance with a different protocol.

In one embodiment, for example, system 100 may comprise part of a cellular network, such as a Universal Mobile Telephone System (UMTS) network compliant with the Third-Generation Partnership Project (3GPP) 3G TS line of specifications ("UMTS Standard"). MS 102 may comprise a UMTS User Equipment (UE). Base station 106 may comprise a portion of a UMTS Terrestrial Radio Access Network (UTRAN) domain. More particularly, base station 106 may comprise a UMTS Node B system. UE 102 and Node B 106 may communicate using a Wideband Code Division Multiple Access (W-CDMA) as the layer 1 (L1) air interface, although the embodiments are not limited in this context.

Although only UE 102 and Node B 106 are shown for purposes of illustration, it can be appreciated that the UMTS network may comprise any number of additional components. For example, Node B 106 may be connected to one or more Radio Network Controllers (RNC) and/or other Node B systems. The RNC may be further connected to one or more Mobile Services Switching Centers (MSC) and/or other RNC. The MSC may be also connected to other networks, such as a packet network or circuit-switched network. The UMTS network may also include a Servicing GPRS Support Node (SGSN). The embodiments are not limited in this context.

In one embodiment, system 100 may comprise part of a wireless LAN, such as an 802.11 network compliant with the Institute of Electrical and Electronics Engineers (IEEE) 802.11 wireless LAN line of specifications ("802.11 Standard"). The 802.11 Standard specifies a common medium access control (MAC) layer, which provides a variety of functions that support the operation of 802.11-based wireless LANs. In general, the MAC layer manages and maintains communications between a plurality of 802.11 stations. Examples of 802.11 stations may include MS 102 configured with one or more radio network cards, and base station 108 configured to operate as wireless access point (WAP). The MAC Layer manages communications between MS 102 and WAP 108 by coordinating access to a shared radio channel and utilizing protocols that enhance communications over a wireless medium. The 802.11 MAC Layer uses an 802.11 Physical (PHY) Layer, such as 802.11b or 802.11a, to perform the tasks of carrier sensing, transmission, and receiving of 802.11 frames.

In one embodiment, system 100 may comprise various other wireless network base stations. Network node 110 may represent a base station configured to operate in accordance with any number of different protocols and standards. For example, network node 110 may represent a Bluetooth network device compliant with the Bluetooth line of specifications ("Bluetooth Standard"). The Bluetooth Standard may comprise a dynamic standard where devices can automatically find each other, establish connections, and discover capabilities on an ad hoc basis. In one embodiment, for example, MS 102 and network node 110 may both comprise Bluetooth enable devices. Accordingly, MS 102 and network node 110 may both comprise at least three basic elements, to include a processor which runs the higher levels of the Bluetooth protocol stack, a baseband link controller which manages the core Bluetooth processes, and a radio which implements the 2.4 Gigahertz (GHz) air interface. The processor may implement various software modules, such as the software modules comprising part of the Bluetooth Application Program Interface (API) libraries, and the Bluetooth Logical Link Control and Adaptation Protocol (L2CAP). The baseband link is responsible for constructing and decoding packets, encoding and managing error correction, encrypting and decrypting for secure communications, calculating radio transmission frequency patterns, maintaining synchronization, controlling the radio, and all of the other low level details necessary to realize Bluetooth communications. The radio transceiver may convert the digital baseband data to and from a 2.4 GHz analog signal using Gaussian Frequency Shift Keying (GFSK) modulation, for example.

Although system 100 may be described with reference to various wireless networks by way of example, it may be appreciated that the embodiments may be implemented in other wireless networks, such as a Global System for Mobile Communication (GSM) and/or Enhanced Data Rates for Global Evolution (EDGE) wireless network, for example. The embodiments are not limited in this context.

In one embodiment, system 100 may communicate information between MS 102 and base stations 106, 108 and 110 in the form of packets or frames as defined by a given protocol. The term "frame" generally refers to encapsulated data at Open System Interconnection (OSI) layer 2. Examples of encapsulated data may include a destination address, control bits for flow control, the data or payload, cyclic redundancy check (CRC) data for error checking, and so forth. The term "packet" generally refers to encapsulated data at OSI layer 3. As used herein, the terms packet, frame and cell may be used interchangeably.

In general, the information within a frame should be arranged in accordance with a predefined frame format. The term "frame format" may define the fields within the frame and the position of the information within each field. For example, a frame may include an address destination field, a length field, an error correcting code (ECC) field or CRC field, encryption initialization vectors, data payloads, headers and trailers to identify the beginning and end of the packet, and so forth. As used herein, the terms "packet format," "frame format", and "cell format", are generally synonymous. Information about a frame format may be collectively referred to herein as "frame format information." Examples of frame format information may comprise a field type and offset bit, with the offset bit indicating the length of a given field.

In one embodiment, system 100 may utilize the same or different protocols using a plurality of different frame formats. As shown above, system 100 may communicate information between MS 102 and base stations 106, 108 and 110 in accordance with a number of different architectures and protocols, such as the UMTS Standard, 802.11 Standard, and Bluetooth Standard, for example. Each protocol may utilize a different frame format. Some protocols may have multiple frame formats, such as the found in the Bluetooth Standard, for example. Consequently, system 100 may use a frame parser to recover frame information for received frames. A frame parser may parse a frame to identify its particular frame format. The term "parse" as used herein may refer to identifying frame format information, such as the position and types of fields within the frame, so that the fields may be processed by the appropriate elements of MS 102. The frame parser may, for example, identify the field type and length of each field for each received frame of information, as well as other desired information.

Conventional techniques to perform frame parsing may be unsatisfactory for a number of reasons. For example, a separate hardware based frame parser may be implemented for each supported protocol. In another example, a single complex frame parser may be implemented to process multiple frame formats. Both of these alternatives, however, may significantly increase the complexity of MS 102, and therefore increase development time and costs. Further, a software based frame parser may be used to process multiple frame formats. A software based frame parser, however, may not be able to handle the processing load of a high speed communication system, such as the examples given for system 100. In addition, all of these solutions may require significant re-engineering to support protocols that are not yet defined.

One embodiment utilizes a reconfigurable hardware-based frame parser to solve these and other potential problems. The elements of the hardware-based frame parser may be reconfigured in real-time to perform frame parsing on frames having varying frame formats. In this manner, the reconfigurable hardware-based frame parser may have the flexibility traditionally associated with software based frame parsers, while having the processing speed needed to keep pace with high speed communication systems. Further, the reconfigurable hardware-based frame parser may be updated to support new protocols and new frame formats as needed.

Figure 2:
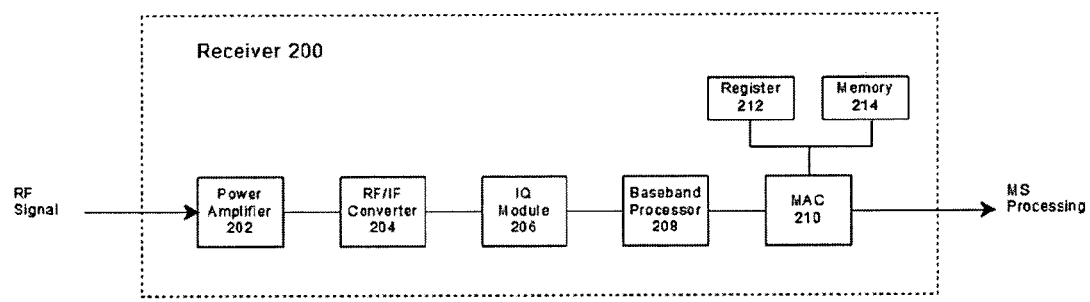
FIG. 2 illustrates a block diagram of a receiver for a mobile station in accordance with one embodiment.

FIG. 2 illustrates a block diagram of a receiver for a mobile station in accordance with one embodiment. FIG. 2 may illustrate a receiver 200. Receiver 200 may be implemented as part of a mobile station, such as MS 102, for example. Receiver 200 may comprise one or more modules. In one embodiment, for example, receiver 200 may comprise a power amplifier 202, an RF/IF converter/synthesizer 204, an IQ module 206, a baseband processor 208 and a media access control (MAC) 210. MAC 210 may further comprise a register 212 and memory 214. Although the embodiment has been described in terms of "modules" to facilitate description, one or more circuits, components, registers, processors, software subroutines, or any combination thereof could be substituted for one, several, or all of the modules.

In operation, receiver 200 may receive an RF signal from a base station via an antenna for MS 102. Power amplifier 202 amplifies the received signal, and outputs the amplified signal to RF/IF converter (or synthesizer) 204. RF/IF converter 204 down samples the amplified received RF signal into an Intermediate Frequency (IF) signal. The IF signal is input to the IQ module 206. IQ module 206 may comprise an IQ modulator-demodulator. IQ module 206 may separate the in-phase (I) and quadrature (Q) signals, and output them to baseband processor 208. Baseband processor 208 converts the signals to a baseband signal. An analog-to-digital (A/D) converter (not shown) may convert the baseband signal from an analog signal to a stream of digital words representing its amplitude variations over time. The stream of digital words may be sent to MAC 210.

In one embodiment, MAC 210 may perform packet or frame processing for receiver 200. MAC 210 may receive a frame of information. MAC 210 may implement a frame parser as part of the frame processing stage. The frame parser may identify the position and type of fields within a frame so that the fields may be processed accordingly. Different fields typically need to be processed by different parts of MAC 210. The frame parser may allow the different processing stages of MAC 210 to know what fields within the frame to operate over. The frame parser may be discussed in more detail with reference to FIGS. 3-6.

Figure 3:
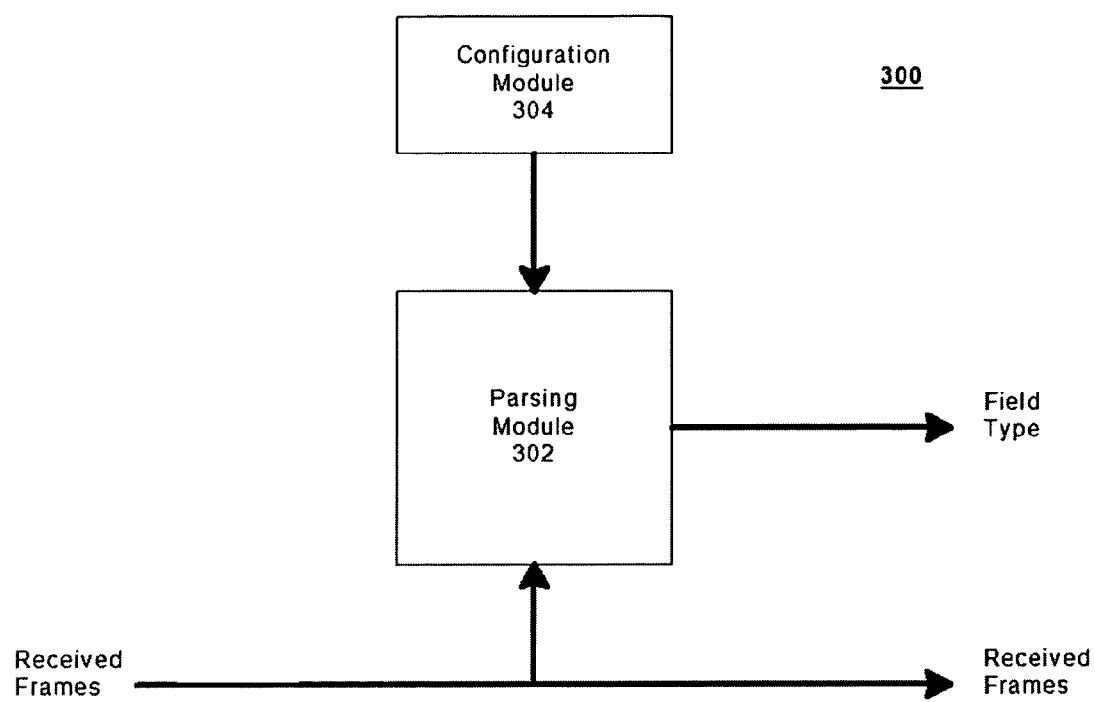
FIG. 3 illustrates a first block diagram of a frame parser in accordance with one embodiment.

FIG. 3 illustrates a first block diagram of a frame parser in accordance with one embodiment. FIG. 3 may illustrate a frame parser 300. In one embodiment, for example, frame parser 300 may comprise a configuration module 304 and a parsing module 302. Although a limited number of elements is shown for frame parser 300, it may be appreciated that frame parser 300 may comprise more or less elements and still fall within the scope of the embodiments.

In one embodiment, frame parser 300 may be implemented as part of MAC 210. It may be appreciated, however, that frame parser 300 may also be implemented in other parts of receiver 200 or MS 102. The embodiments are not limited in this context.

In one embodiment, frame parser 300 may comprise a reconfigurable hardware-based frame parser that can parse a frame format for a frame based on the current configuration of parsing module 302. Frame parser 300 may be dynamically reconfigured to enable parsing of frames having different frame formats. For example, frame parser 300 may receive a frame of information. The frame of information may be received from, for example, receiver 200. Parsing module 302 may include control logic to determine a frame format associated with the frame of information. The control logic may determine the frame format by examining the contents of the frame. Parsing module 302 may be reconfigured to parse the frame of information. Parsing module 302 may then parse the frame for frame format information, such as field type and length of field as indicated by an offset bit, for example.

In one embodiment, parsing module 302 may be reconfigured using configuration information from configuration module 304. The term "configuration information" as used herein may refer to the instructions and data to reconfigure one or more hardware elements of parsing module 302 to parse a particular frame format associated with a given protocol. For example, the control logic of parsing module 302 may be configured to retrieve configuration information corresponding to the determined frame format. The configuration information may be stored with configuration module 304, for example. The control logic may reconfigure parsing module 302 in accordance with the retrieved configuration information.

In one embodiment, reconfigurable hardware-based frame parser 300 may be implemented in a number of different ways. For example, frame parser 300 may be implemented using updateable tables to drive a table driven hardware parser. In another example, frame parser 300 may be implemented using microcode to program a micro sequenced hardware parser. It may be appreciated that these implementations, however, are given by way of example only. Any type of reconfigurable hardware elements may be used for frame parser 300 modified in accordance with the techniques described herein. These particular embodiments may be discussed in more detail with reference to FIGS. 4 and 5.

Figure 4:
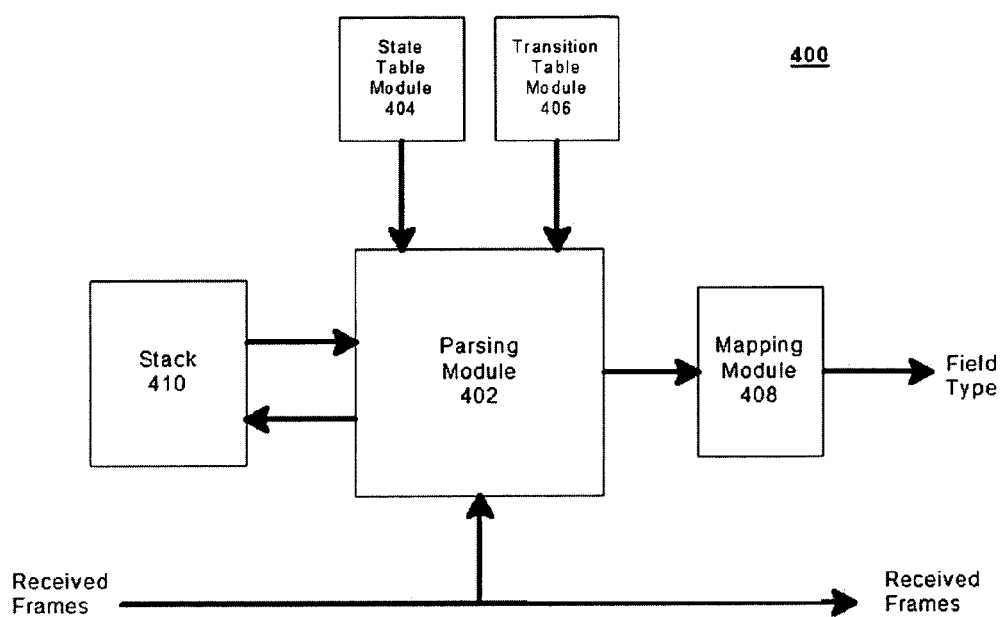
FIG. 4 illustrates a second block diagram of a frame parser in accordance with one embodiment.

FIG. 4 illustrates a second block diagram of a frame parser in accordance with one embodiment. FIG. 4 illustrates a frame parser 400. Frame parser 400 may be a representative implementation of, for example, frame parser 300. In one embodiment, frame parser 400 may comprise a parsing module 402, state table module 404, transition table 406, mapping module 408 and stack 410. Although a limited number of elements is shown for frame parser 400, it may be appreciated that frame parser 400 may comprise more or less elements and still fall within the scope of the embodiments.

In one embodiment, frame parser 400 may be implemented as a non-deterministic push down finite automaton (NPDA). Parsing module 402 may comprise a table driven NPDA. State table module 404 may store state information for parsing module 402. Transition table module 406 may store transition information for parsing module 402. Stack 410 may be a First-In First-Out (FIFO) structure. Parsing module 402 may push and pop information to and from stack 410, respectively. Mapping module 408 may map state to field type for parsing module 402.

In one embodiment, parsing module 402 may be reconfigured using state information and transition information from state table module 404 and transition table module 406, respectively. The state information and transition information may be used to reconfigure one or more hardware elements of parsing module 402 to parse a particular frame format associated with a given protocol. For example, the control logic of parsing module 402 may be configured to retrieve the appropriate state and transition information corresponding to the determined frame format. The control logic may reconfigure parsing module 402 in accordance with the state and transition information.

Figure 5:
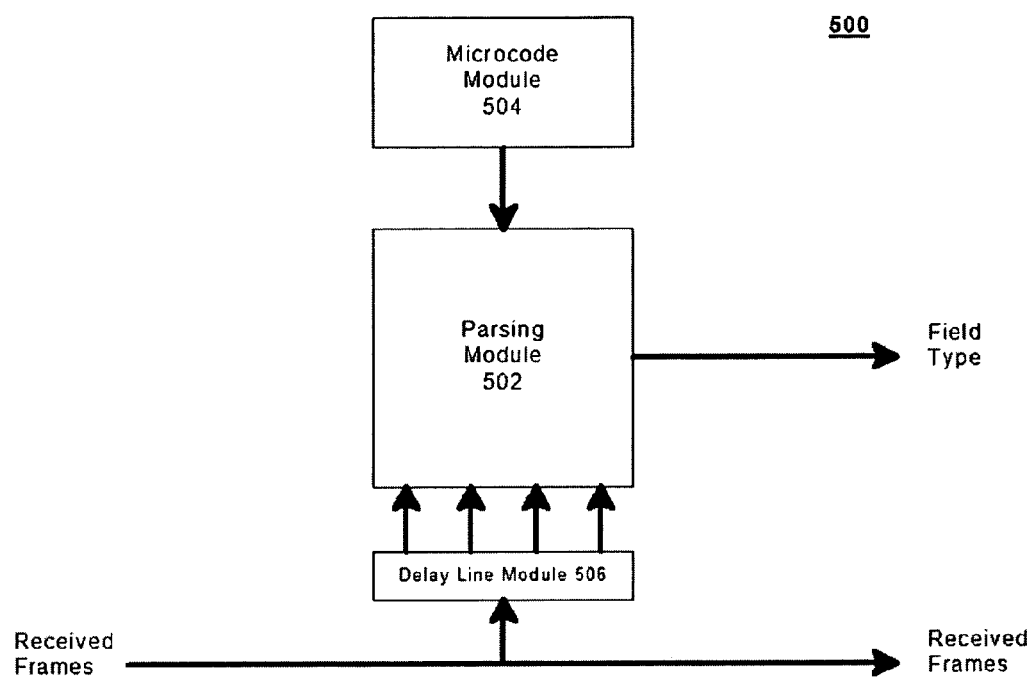
FIG. 5 illustrates a third block diagram of a frame parser in accordance with one embodiment.

FIG. 5 illustrates a third block diagram of a frame parser in accordance with one embodiment. FIG. 5 illustrates a frame parser 500. Frame parser 500 may be a representative implementation of, for example, frame parser 300. In one embodiment, frame parser 500 may comprise a parsing module 502, a microcode module 504, and a delay line module 506. Although a limited number of elements is shown for frame parser 500, it may be appreciated that frame parser 500 may comprise more or less elements and still fall within the scope of the embodiments.

In one embodiment, frame parser 500 may be implemented as a micro sequencer, with branching driven by mask data and compare data. Frame parser 500 may use the mask and compare data to decode field types by examining bit fields within the data of the last N received data elements. For example, parsing module 502 may be a micro sequencer with mask and compare branching logic. Microcode module 504 may comprise microcode information, such as mask data, compare data, branch addresses, field types, and so forth. Delay line module 506 may be configured to have a length of N, where N represents the number of last received elements.

In one embodiment, parsing module 502 may be reconfigured using microcode information from microcode module 504. The microcode information may be used to reconfigure one or more hardware elements of parsing module 502 to parse a particular frame format associated with a given protocol. For example, the control logic of parsing module 502 may be configured to retrieve the appropriate microcode information corresponding to the determined frame format. The control logic may reconfigure parsing module 402 in accordance with the retrieved microcode information.

Figure 6:
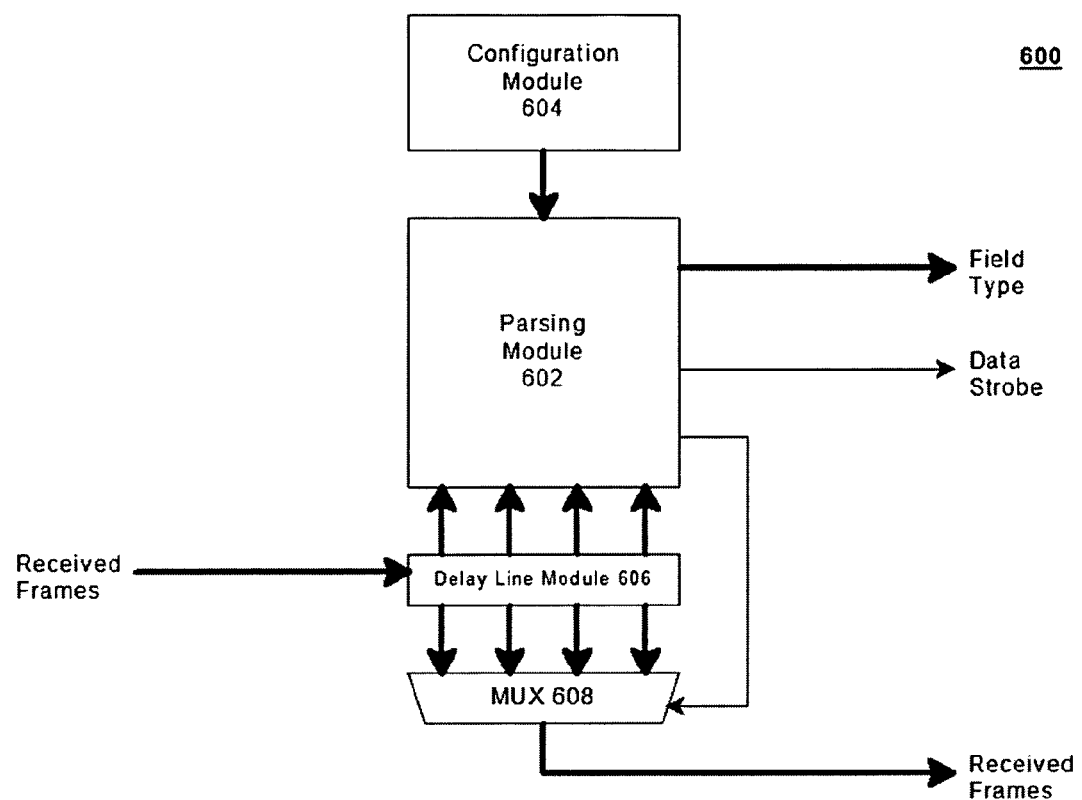
FIG. 6 illustrates a fourth block diagram of a frame parser in accordance with one embodiment.

FIG. 6 illustrates a fourth block diagram of a frame parser in accordance with one embodiment. FIG. 6 may illustrate a frame parser 600. Frame parser may be similar to frame parser 300. For example, frame parser 600 may also comprise a configuration module 604 and a parsing module 602. In addition, frame parser 600 may further comprise a delay line module 606 and multiplexer (MUX) 608. Although a limited number of elements is shown for frame parser 600, it may be appreciated that frame parser 600 may comprise more or less elements and still fall within the scope of the embodiments.

One of the advantages of implementing a reconfigurable hardware-based frame parser may be an increase in processing speed of the frame parser. There may be instances, however, where the clock speed of the frame parser is not significantly faster than the arrival rate of received data elements. In this case, it may be desirable to buffer and delay the data elements through the frame parser. The length of delay should be sufficient to parse the field type information from a given frame, and send the field type information to the rest of the MAC at the same time as the received data elements. Synchronizing the passing of the received data elements and parsed field types may simplify other logic in the MAC, for example.

Accordingly, frame parser 600 may include a delay line module 606 and MUX 608. Delay line module 606 may have a length of N, where N is the number of last received elements. The received frames may be stored in a buffer implemented with, or controlled by, delay line module 606. Once parsing module 602 parses the field type from the received frame, parsing module 602 may send a select output data signal to MUX 608. MUX 608 may output data elements in accordance with the select output data signal.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. An apparatus, comprising:
   a microcode module to store microcode information including instructions to reconfigure one or more hardware elements, the microcode module comprises microcode memory to store mask data, compare data, branch addresses and field types; and
   a hardware-based parsing module to connect to said microcode module, said parsing module comprising a microcode sequencer configured to use mask and compare data to decode field types in a received frame of information to determine a frame format associated with said frame, retrieve microcode information corresponding to said frame format, and reconfigure a set of hardware elements to parse said frame based on the retrieved microcode information from the microcode module.

2. The apparatus of claim 1, wherein said parsing module outputs a field type for said frame.

3. The apparatus of claim 1, further comprising a delay line module to buffer said frame during said frame parsing.

4. The apparatus of claim 1, further comprising a delay line module to buffer said frame during said frame parsing.

5. A system, comprising:
   at least one base station to communicate frames of information using a plurality of different frame formats; and
   a mobile station to receive said frames of information, said mobile station comprising a receiver to receive and process said frames, said receiver comprising a reconfigurable hardware-based frame parser comprising a microcode module to store microcode information including instructions to reconfigure one or more hardware elements, the microcode module comprises microcode memory to store mask data, compare data, branch addresses and field types, and a parsing module to connect to said microcode module, said parsing module comprising a microcode sequencer configured to use mask and compare data to decode field types in a received frame of information to determine a frame format associated with said frame, retrieve microcode information corresponding to said frame format, and reconfigure a set of hardware elements to parse said frame in accordance with said different frame formats and the retrieved microcode information from the microcode module.

6. The system of claim 5, wherein said receiver comprises:
a power amplifier;
an RF/IF converter to connect to said power amplifier;
an IQ module to connect to said RF/IF converter;
a baseband processor to connect to said JQ module; and
a media access controller to connect to said baseband processor.

7. The system of claim 6, wherein said media access controller comprises said reconfigurable hardware-based frame parser.

8. The system of claim 5, further comprising a delay line module to buffer said frame during said frame parsing.

9. A method to perform frame parsing, comprising:
receiving a frame of information;
determining a frame format associated with said frame using mask and compare data to decode field types for the frame;
retrieving microcode information from a microcode module corresponding to said frame format, the microcode information including instructions to reconfigure one or more hardware elements and the microcode module comprising a microcode memory to store mask data, compare data, branch addresses and field types;
reconfiguring a parsing module, comprising a microcode sequencer, to parse said frame of information using said and microcode information from the microcode module; and
parsing said frame for frame format information using said reconfigured parsing module.

10. The method of claim 9, further comprising delaying said frame until said frame format information is parsed.

* * * * *